M. F. POTTER & R. F. ROBINSON.
WHEEL CHAIR.
APPLICATION FILED OCT. 20, 1914.
1,164,863.
Patented Dec. 21, 1915.
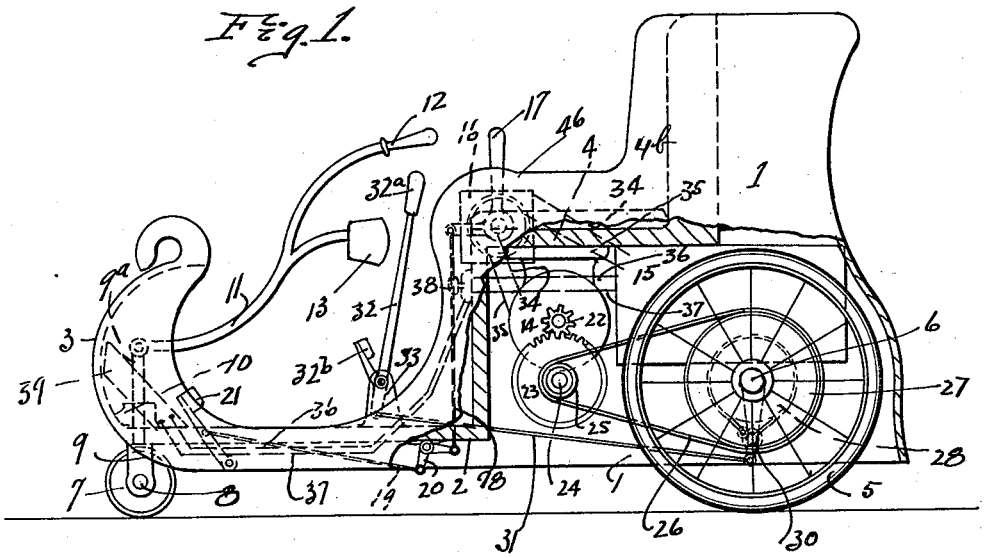
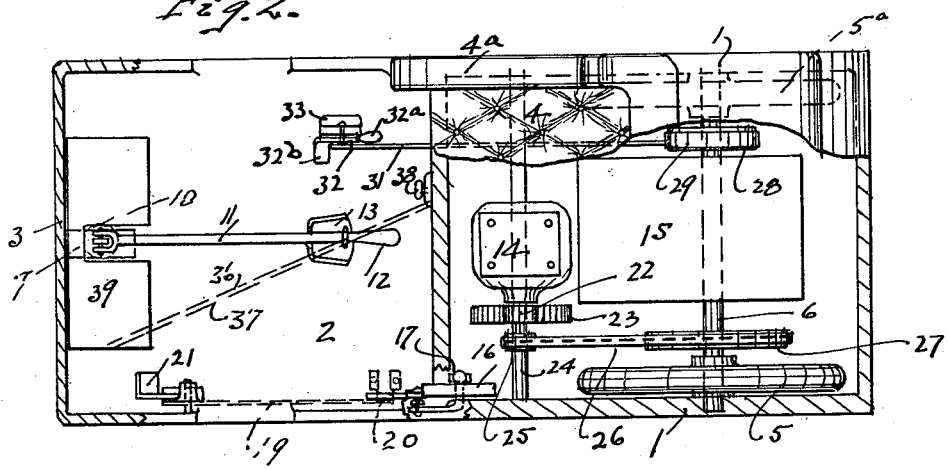
WITNESSES:
INVENTORS
Ray F. Robinson
Minnie F. Potter.
BY Fred P. Goin
ATTORNEY

UNITED STATES PATENT OFFICE.

MINNIE F. POTTER AND RAY F. ROBINSON, OF SEATTLE, WASHINGTON.

WHEEL-CHAIR.

1,164,863.

Specification of Letters Patent.

Patented Dec. 21, 1915.

Application filed October 20, 1914. Serial No. 867,597.

*To all whom it may concern:*

Be it known that we, MINNIE F. POTTER and RAY F. ROBINSON, citizens of the United States, and residents of Seattle, in the county of King and State of Washington, have invented certain new and useful Improvements in Wheel-Chairs, of which the following is a specification.

Our invention relates to wheel chairs and has for its principal objects, to provide a power driven wheel chair for the use of invalids or maimed persons who do not desire, or are not physically able to operate a manually operated chair.

A further object is to provide means for controlling the guiding, starting, stopping, application of brakes, etc., which may be operated by a person who has but partial use of his limbs. Means for warming the extremities of the occupant are also provided.

Other objects will appear as our invention is more fully described in the following specification, illustrated in the accompanying drawings, and pointed out in the appended claim.

In the drawings, Figure 1 is a side elevation of our device with parts broken away. Fig. 2 is a plan view of Fig. 1 with parts broken away.

Referring more particularly to the drawings, numeral 1 designates the side frames of a wheel chair body, 2 a floor, 3 a dash board and 4 a seat having arms 4ª and 4ᵇ. The body is carried upon traction wheels 5 and 5ª which are secured to a shaft 6 which takes bearing in side frames 1 and a steering wheel 7 which is carried on a shaft 8 taking bearing in a fork 9 which in turn passes upward through a bearing 10 in floor 2. The upper end of fork 9 terminates in a post 9ª to which is pivotally secured a steering lever 11. The steering lever 11 has a hand control 12 and a knee control 13, which is adapted to be used by the knee or the stump of a limb in operating the steering lever 11. A motor 14 is secured to the under side of the seat 4. Current is supplied to the motor from a storage battery contained in battery box 15 through a controller 16, said controller being operated by either a lever 17 or by means of links 18 and 19, bell crank 20 and foot lever 21. Motor 14 is provided with a pinion 22 which meshes with a gear 23 secured to shaft 24. Shaft 24 takes bearing at either end in side frames 1. A sprocket 25 is also secured to shaft 24. A chain 26 passes over sprocket 27 which is secured to shaft 6. A brake wheel 28 is also secured to shaft 6, and said brake wheel is provided with a brake band 29 which is attached to a tightener 30. A rod 31 connects the tightener 30 to a lever 32 which is mounted on a bearing 33 on the floor 2. The lever 32 has both a hand operating handle 32ª and a foot pedal 32ᵇ. The brake may be applied by pushing the lever 32 forward with either the foot or the hand. Wires 34 and 35 form circuits from the batteries through the controller 16 to the motor 14. Wires 36 and 37 form a circuit from the batteries through a switch 38, located just in front of the seat to a foot warmer 39 which is located under the dash board 3 and within convenient reach of the occupant's foot. In order to start the wheel chair, it is only necessary to move the controller into a contact position by operating either the lever 17 or the foot lever 21, thus closing the circuit between the batteries and the motor 14.

While wheel chairs having manually operated means of locomotion and which are adapted to be propelled by the occupant are well known in the art, yet it is obvious that many invalids and maimed persons have not the strength or faculties to so operate a wheel chair. Many of the above mentioned persons could easily operate a wheel chair of the above described type. It is also obvious that with but minor changes, our wheel chair would be adaptable as a pleasure chair in place of the type commonly pushed by an attendant.

It is obvious that many minor changes in construction and operation will suggest themselves to anyone skilled in the art, and we therefore, do not wish to be limited to the exact form and construction shown.

What we claim as new and desire to protect by Letters Patent is—

In a wheeled chair, the combination of an electrical motor and driving connections between the same and the wheels, an electrical foot warmer and connections between the same and the battery, means for stopping and starting the motor, including a hand operated controller near the driver's seat, a foot operated lever and connections between the controller and the lever; braking mechanism which includes a band brake for the wheels and a lever whose upper end is near the driver and a pedal upon the lower extremity of the lever, a connecting rod between the lever and the band brake; a steering mechanism which includes a single front wheel turnable on its vertical axis and a combined knee and hand operated lever for the said wheel.

MINNIE F. POTTER.
RAY F. ROBINSON.

Witnesses:
FRED P. GORIN,
WINIFRED KNOPH.

Copies of this patent may be obtained for five cents each, by addressing the "Commissioner of Patents, Washington, D. C."